UNITED STATES PATENT OFFICE.

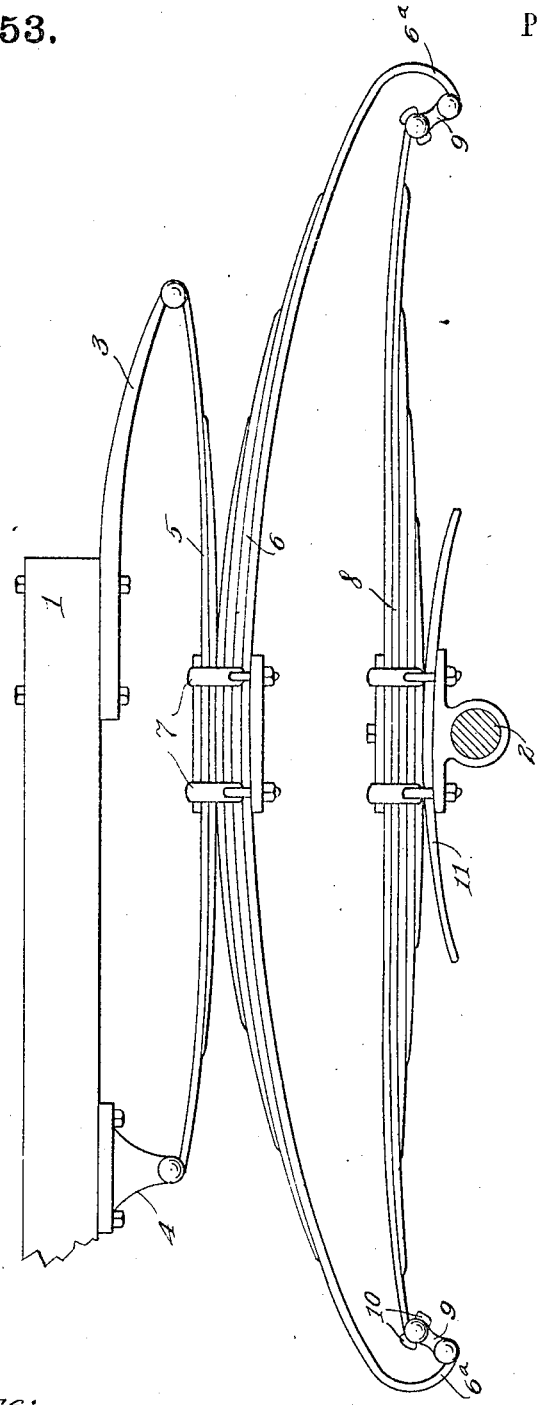

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,291,653.  Specification of Letters Patent.  Patented Jan. 14, 1919.

Application filed March 10, 1914. Serial No. 823,816.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and has for its general object the production of a spring wherein strength and resiliency are combined, thereby securing ease of riding under light and heavy loads while efficiently withstanding the shocks and strains and other incidents of use. A further object of the invention is to provide a spring seat which is not only novel in itself but which is particularly adapted for coöperation with the peculiar form of spring illustrated herein.

In the drawing forming part hereof the figure represents a side elevation of a spring and a spring seat constructed in accordance with my invention, showing the same applied to the frame and axle of a vehicle.

Describing the parts by reference numerals, 1 represents the frame and 2 the axle of a vehicle. The frame is provided with a pair of hangers 3 and 4, the hanger 3 projecting forwardly (or rearwardly) from the frame and being of the "horn" type while the hanger 4 projects downwardly from the frame. Interposed between the frame and the axle is a composite spring consisting generally of an upper and a lower spring member, the upper spring member comprising two sections placed back-to-back and the lower member comprising a single section. The upper section 5 of the upper member consists of a light semi-elliptic spring, the said spring being shown as composed of two leaves only, one end of the said spring being connected in the usual manner to the hanger 3 and the opposite end being connected in like manner to the hanger 4. The lower section of the upper member is indicated at 6, and this section is longer and heavier than the upper section (being shown as composed of four leaves). The spring sections 5 and 6 are placed back-to-back and are connected by means of spring clips 7.

The downwardy extending ends of the main plate of the section 6 are formed into scrolls 6ª which extend around and are flexibly connected to the ends of the lower spring member 8. This member is substantially straight and, when connected to the section 6 and subjected to the weight of the vehicle body, the ends of the member 8 are deflected downwardly somewhat, as will appear from the drawing. The spring member 8 is shorter and heavier than the spring section 6, being shown as composed of five plates and its strength is substantially equal to the combined strength of the two sections 5 and 6 of the upper spring member. The ends of the spring member 8 are connected to the scroll ends 6ª of the section 6 by means of shackles 9, each of said shackles being provided at its upper end with bosses 10 which are adapted to engage respectively the upper and the lower surface of the main plate of the spring member 8 and prevent the scroll ends of the spring section 6 from assuming positions which might interfere with their action and injure the scrolls as well as the spring section of which the scroll ends form a part; they also prevent any disarrangement of the proper relative positions of the eyes of the scrolls and the eyes of the lower spring member under the most violent action of the spring members. The details of construction of these shackles and their relation to the spring members are set forth, described, and claimed in my Patent No. 1,083,022, issued December 30, 1913, wherein the invention covered by this application is disclosed but not specifically claimed.

Between the lowermost or shortest leaf of the lower spring member 8 and the axle 2 there is interposed an elongated spring seat 11, which spring seat is of substantially the same length as the length of the bottom or shortest leaf of said member but is curved reversely with respect to said leaf. This seat engages the lowest leaf of the member 8 and gradually reinforces said member as the latter is deflected downwardly.

In operation, the upper spring member, being the lightest, is deflected the most by the initial or light load, the lower portion of the upper member and the lower member being proportionally less deflected. Under a load that will nearly straighten the section 5, the section 6 acts as a cushion therefor and is itself but slightly deflected. Under heavier load, the section 5 begins to bow reversely and to increase its bearing on the section 6, and the latter section will now be deflected more rapidly than before and more rapidly than the section 5. The lower member meanwhile is deflected, but not so rapily as the section 6. When the section 5 has gotten its full bearing on the section 6 (under a heavy load or shock) the two sections act as one and the rate of deflection of the upper and lower members is substantially the same. The result is to produce a graduated absorption of load and shocks which will secure ease of riding alike under light and heavy loads and shocks and, in the case of light loads, provide ample reserve strength for emergencies.

The form of the lower spring member illustrated and described herein is particularly adapted to minimize any tendency of the spring to shear from the axle when the vehicle wheel encounters an obstruction, the tendency of the lower spring member being to hub the seat 10 and the axle and thus resist such shearing action.

Having thus described my invention, what I claim is:—

1. The combination, with the frame and axle of a vehicle, of a spring comprising an upper and a lower member, the upper member comprising a pair of leaf-spring sections secured together back to back at their body portions, means connecting the upper section and the vehicle frame, a spring seat secured to the axle and extending on both sides thereof and being downwardly curved on both sides of the axle, means connecting said spring-members, and means securing the lower spring member to the axle and seat, substantially as specified.

2. The combination, with the frame and axle of a vehicle, of a spring comprising an upper and a lower spring member, the upper spring member being connected to the frame and the lower spring member being substantially straight connections between the ends of said spring members, a spring seat interposed between the under surface of the lower spring member and the axle, said seat curving downwardly on both sides of the axle, and means connecting the lower spring member to said seat, substantially as specified.

In testimony whereof, I hereunto affix my signature in the presence of two witnesses.

MICHAEL M. McINTYRE.

Witnesses:
J. B. HULL,
H. B. McGILL.

Copies of this patent may be obtained for five cents each, by addressing the "Commissioner of Patents, Washington, D. C."